US010020520B2

(12) United States Patent
Kusy et al.

(10) Patent No.: US 10,020,520 B2
(45) Date of Patent: Jul. 10, 2018

(54) BIPOLAR PLATE AND FUEL CELL COMPRISING A BIPOLAR PLATE OF THIS TYPE

(71) Applicant: VOLKSWAGEN AG, Wolfsburg (DE)

(72) Inventors: Matej Kusy, Burnaby (CA); Ian Stewart, Burnaby (CA); Brian Dickson, Burnaby (CA)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 15/543,958

(22) PCT Filed: Dec. 15, 2015

(86) PCT No.: PCT/EP2015/079695
§ 371 (c)(1),
(2) Date: Jul. 14, 2017

(87) PCT Pub. No.: WO2016/113055
PCT Pub. Date: Jul. 21, 2016

(65) Prior Publication Data
US 2018/0013154 A1    Jan. 11, 2018

(30) Foreign Application Priority Data

Jan. 15, 2015   (DE) .................. 10 2015 200 573

(51) Int. Cl.
*H01M 8/0254*    (2016.01)
*H01M 8/0256*    (2016.01)
(Continued)

(52) U.S. Cl.
CPC ....... *H01M 8/0265* (2013.01); *H01M 8/0256* (2013.01); *H01M 8/0267* (2013.01); *H01M 8/0254* (2013.01)

(58) Field of Classification Search
CPC ............. H01M 8/0267; H01M 8/0256; H01M 8/0265; H01M 8/0254
See application file for complete search history.

(56) References Cited

U.S. PATENT DOCUMENTS 6,793,544 B2    9/2004    Brady et al.
7,291,414 B2 *  11/2007   Goebel ............... H01M 8/0254
                                                429/434
(Continued)

FOREIGN PATENT DOCUMENTS

DE    20 2005 008 749 U1    10/2006
DE    10 2007 042 985 A1     3/2009
(Continued)

*Primary Examiner* — Muhammad S Siddiquee
(74) *Attorney, Agent, or Firm* — Seed IP Law Group LLP

(57) ABSTRACT

The invention relates to a bipolar plate (10) for a fuel cell (100), comprising—an internal coolant flow field (33), which comprises a coolant channel (43), and—a first and a second flat side (11, 12) with a first and second reactant flow field (31, 32) respectively, which has at least one first and second channel structure (41, 42) respectively, wherein—the first and the second channel structure (41, 42) each form a trunk channel (44) and branch channels (46), wherein the branch channels (46) branch off in a branching region (48) from the respective trunk channel (44), and a first intermediate region (51) is formed between the branch channels (46) of the first channel structure (31), and a second intermediate region (52) is formed between the branch channels (46) of the second channel structure (32), wherein normal projections of the first and second intermediate region (51, 52) onto a center plane (56) of the bipolar plate (10), which center plane is arranged between the two flat sides (11, 12) of the bipolar plate (10), partially overlap so that an overlapping region (53) is formed. It is provided that the coolant channel (43) extends from an outer region (54), which is located outside the first and second intermediate region (51,
(Continued)

Figure 1:
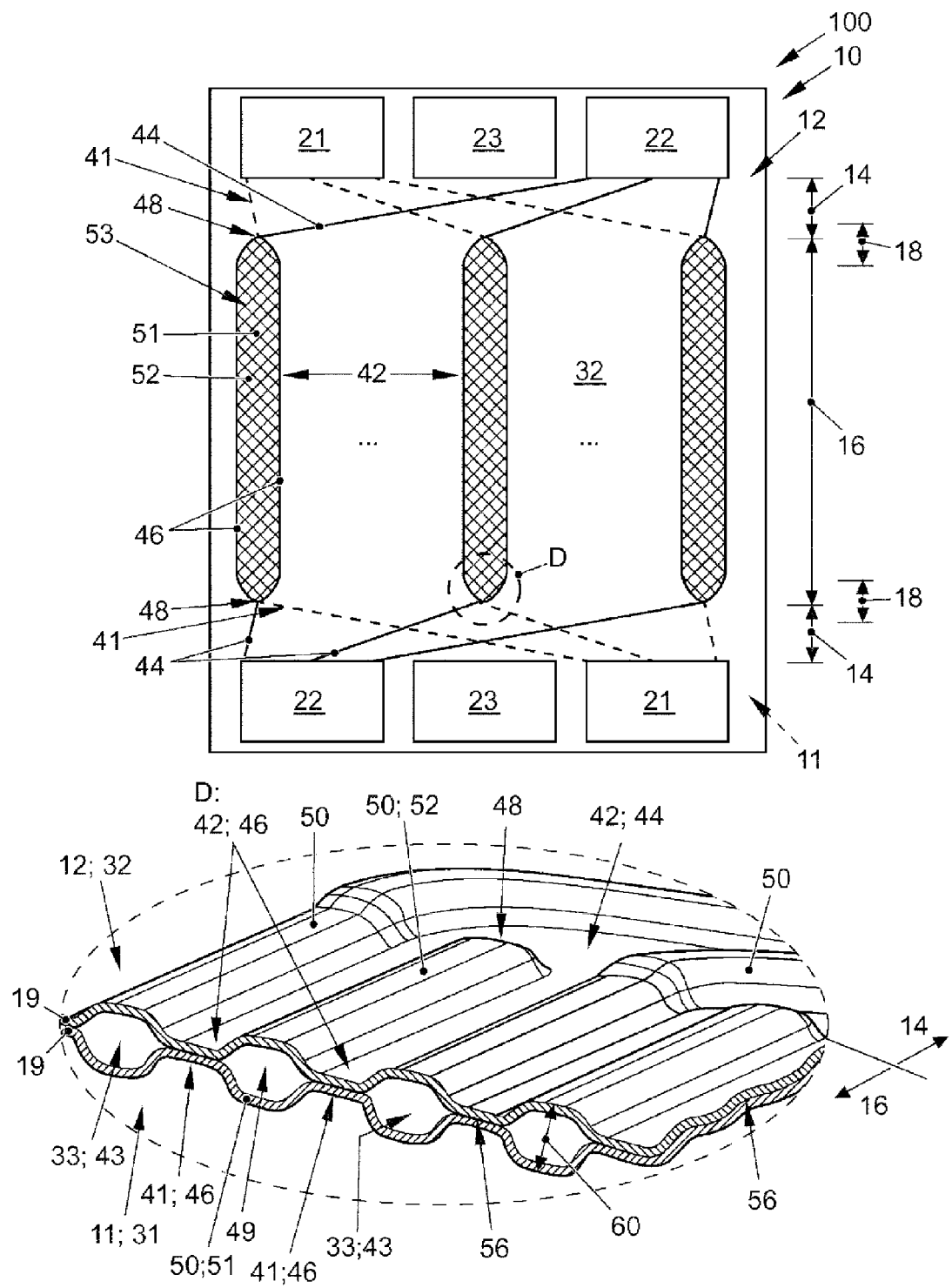

52), into the overlapping region (53), crossing a transit region (55) in the process, wherein the transit region (55) is a subregion of the normal projection of the first intermediate region (51) onto the center plane, which projects from the overlapping region (53).

18 Claims, 6 Drawing Sheets

(51) Int. Cl.
  *H01M 8/0265* (2016.01)
  *H01M 8/0267* (2016.01)

(56) References Cited

U.S. PATENT DOCUMENTS

| | | | |
|---|---|---|---|
| 2005/0260472 A1* | 11/2005 | Rapaport | F28D 9/005 |
| | | | 429/435 |
| 2015/0228987 A1 | 8/2015 | Andreas-Schott et al. | |
| 2016/0118673 A1* | 4/2016 | Andreas-Schott | H01M 8/0258 |
| | | | 429/434 |

FOREIGN PATENT DOCUMENTS

| | | |
|---|---|---|
| DE | 10 2010 056 014 A1 | 6/2012 |
| DE | 10 2012 020 947 A1 | 4/2014 |
| DE | 11 2004 000 171 B4 | 5/2014 |

* cited by examiner

BIPOLAR PLATE AND FUEL CELL COMPRISING A BIPOLAR PLATE OF THIS TYPE

The invention relates to a bipolar plate for a fuel cell and a fuel cell comprising a bipolar plate of this type.

Fuel cells use the chemical conversion of a fuel with oxygen into water in order to generate electrical energy. For this purpose, fuel cells contain as core component the so-called membrane electrode assembly (MEA), which is a combination of an ion-conducting, in particular a proton-conducting, membrane and an electrode (anode and cathode) arranged on each side of the membrane. During operation of the fuel cell, the fuel, in particular hydrogen $H_2$ or a gas mixture containing hydrogen, is guided to the anode where an electrochemical oxidation with loss of electrons takes place ($H_2 \rightarrow 2\ H^+ + 2\ e^-$). Via the membrane, which separates the reaction chambers gas-tightly from one another and electrically insulates them, the protons $H^+$ are transported from the anode chamber into the cathode chamber (in a water-bound or water-free manner). The electrons $e^-$ provided at the anode are guided to the cathode via an electrical line. The cathode is supplied with oxygen or a gas mixture containing oxygen, so that a reduction of the oxygen with gain of electrons takes place ($\frac{1}{2}\ O_2 + 2\ e^-\ O^{2-}$). At the same time, those oxygen anions react in the cathode chamber with the protons transported via the membrane while forming water ($2H^+ + O^{2-} \rightarrow H_2O$).

Generally, the fuel cell is formed by a plurality of membrane electrode assemblies arranged in the stack, the electrical power outputs of which add up. In a fuel cell stack, between each two membrane electrode assemblies a bipolar plate is arranged, which on the one hand serves to supply the process gases to the anode and cathode of the adjacent membrane electrode assemblies and on the other hand to supply coolant to remove heat. Bipolar plates are also made of an electrically conductive material in order to establish the electrical connection. They thus provide the three-fold function of process gas supply for the membrane electrode assemblies, cooling, and electrical connection.

Bipolar plates for fuel cells typically have operating media passages (often also called ports), specifically two anode gas openings for the supply and discharge of the anode gas, two cathode gas openings for the supply and discharge of the cathode gas, and two coolant openings for the supply and discharge of the coolant. In the fuel cell stack, these operating media passages coincide with each other so that they form main supply lines for the corresponding operating media passing through the entire stack. The coolant openings are fluidically connected to each other via an internal coolant flow field extending within the bipolar plate. An anode gas flow field open on the anode side fluidically connects the two anode gas openings to each other, while a cathode gas flow field open on the cathode side fluidically connects the two cathode gas openings to each other. The anode gas and cathode gas flow fields are mostly formed in the shape of discrete gutter-type channels. The anode gas flow fields and the cathode gas flow fields have a typically centrally arranged active region, which connects to the catalytic electrodes of the membrane electrode assembly and at which the actual fuel cell reactions occur. Arranged between the active region and one of the two anode gas openings is a distributor region. Arranged between the active region and the other of the two anode gas openings is another distributor region. Analogously to this, the cathode-side active region is also arranged between two distributor regions, which connect the active region to the cathode gas openings. The distributor regions are used, depending on the flow direction of the reactants, for the even distribution of a flow to the active region or for the "collection" of the flow after an exit from the active region.

Basic goals in the development of bipolar plates include the reduction of the weight, of the installation space and of the costs as well as the increase of the power density. These criteria are important in particular for the mobile use of fuel cells, for example for the electric motor traction of vehicles.

For example, U.S. Pat. No. 7,291,414 B2 discloses a bipolar plate having stamped and nested half plates. In order to allow for a connection of anode, cathode and coolant channels to the associated operating media openings, the bipolar plate has a greater thickness outside the active region than inside the active region. This is made possible because a gas diffusion layer is arranged only in the active region.

Bipolar plates are also known, in which channels of the anode gas flow field in the active region extent mirror-symmetrically to channels of the cathode gas flow field. The object of the invention is to provide a bipolar plate for fuel cells that, despite a comparatively thin design, is distinguished by a homogeneous distribution of operating media.

The object is achieved by a bipolar plate and a fuel cell comprising a bipolar plate of this type having the features of the independent claims.

The bipolar plate according to the invention for a fuel cell comprises:
an internal coolant flow field that includes a coolant channel,
a first flat side having a first reactant flow field that has at least one first channel structure, and
a second flat side having a second reactant flow field that has at least one second channel structure,
wherein
the first flat side and the second flat side are arranged on opposing sides of the bipolar plate, and
the first and second channel structures respectively form a trunk channel and branch channels, wherein
the branch channels branch off from the respective trunk channel in a branching region, and a first intermediate region is formed between the branch channels of the first channel structure and a second intermediate region is formed between the branch channels of the second channel structure, wherein normal projections of the first and second intermediate region onto a center plane of the bipolar plate, which center plane is arranged between the two flat sides of the bipolar plate, partially overlap so that an overlapping region is formed.

In a characterizing manner, it is provided that the coolant channel extends from an outer region, which is located outside the first and second intermediate region, into the overlapping region, crossing a transit region in the process, wherein the transit region is a subregion of the normal projection of the first intermediate region onto the center plane, which subregion projects from the overlapping region.

It is thus provided according to the invention that the coolant channel crosses a transit region, that is, a region in which only the first intermediate region is arranged, in a transition from a region outside the two intermediate regions (the outer region) into a region in which the two intermediate regions overlap (the overlapping region). By virtue of the coolant channel not abruptly entering the overlapping region from the outer region but instead first entering the first intermediate region and with an offset the second intermediate region, more space is available for the coolant channel in a thickness direction, that is, in a direction orthogonal to the flat sides. The coolant channel can have a directional component parallel to the center plane and/or a directional component orthogonal to the center plane when crossing (running through) the transit region.

This is especially the case if a space requirement of the first channel structure and/or the second channel structure is limited in the thickness direction to one half of the bipolar plate. Thus, the other half of the bipolar plate remains for the cooling channel in order to extend first past the first channel structure into the first intermediate region (into the transit region) and then past the second channel structure also into the second intermediate region, and thus into the overlapping region.

The listed regions can be understood as regions in an orthogonal top view of one of the flat sides of the bipolar plate. Regions in the interior of the bipolar plate or ones that are out of view show through the bipolar plate in this type of view. The regions can also be viewed overall as normal projections onto the center plane arranged between the two flat sides of the bipolar plate, in particular between the two halves of the bipolar plate. The fact that the coolant channel extends from an outer region, which is located outside the first and second intermediate region, into the overlapping region, crossing the transit region in the process, can also be understood in the orthogonal top view (so that a two-dimensional image within a plane results).

The internal coolant flow field typically connects at least two coolant openings of the bipolar plate. The coolant openings are operating media passages and are used for the supply and discharge of coolant to and from the bipolar plate within the fuel cell. The coolant openings typically run through the bipolar plate in the thickness direction, so that coolant lines (main supply lines for coolant) are formed inside the fuel cell, which coolant lines run through the bipolar plate in the thickness direction. The coolant flow field is typically a flow field between the coolant openings that is closed toward the outside.

The reactant flow fields typically connect at least two associated reactant openings of the bipolar plate. Thus, the first reactant flow field connects two first reactant openings, while the second reactant flow field connects two second reactant openings. The reactant openings are also operating media passages and are used inside the fuel cell for supplying reactants to the bipolar plate and discharging a reaction product (especially water) and unused reactants from the bipolar plate. The reactant openings typically also run through the bipolar plate in the thickness direction so that first and second reactant lines (main lines for a first reactant and main lines for a second reactant) are formed within the fuel cell, which reactant lines run through the bipolar plate in the thickness direction. The reactant flow fields are typically flow fields that are open on the respective flat side.

Typically, the individual channels (that is, the trunk channels and branch channels) of the coolant flow field, of the first reactant flow field and/or of the second reactant flow field form discrete flow channels. As a result, flow fields with a plurality of channel structures can preferably be realized, which flow fields respectively connect two operating media passages to each other but have no connection to each other outside the operating media passage. Thus, an even distribution of the coolant and the reactants along the bipolar plate can be ensured.

Within the context of the present invention, the flat sides refer to those sides of the bipolar plate that have the largest surfaces in terms of magnitude. The flat sides in this case have the reactant flow fields and their channel structures and, if necessary, other structures. Furthermore, the operating media passages run through the flat sides.

The trunk channels of the channel structures are preferably fluidically connected to the respective reactant openings. Thus, the trunk channel of the at least one first channel structure is connected to one of the first reactant openings, while the trunk channel of the at least one second channel structure is connected to one of the two reactant openings. Thus, the branch channels lead (further) into the active region. Within the meaning of the present invention, the term "branch channels" is understood to mean at least two branch channels. The trunk channels of the channel structures are thus typically arranged closer to the reactant openings than the branch channels branching off from them. In other words, the trunk channels lead starting from the branching regions to the reactant openings and the branch channels lead away from the reactant openings.

Preferably, the transit region is arranged in a boundary region of an active region of the bipolar plate with a distribution region of the bipolar plate. A surface of the boundary region is preferably no more than 10%, in particular no more than 5%, of a surface of the active region. The transit region can thus be arranged both in the active region and alternatively or additionally in the distributor region. As a result of this design, the transit region is arranged in a particularly space-saving manner.

Preferably, the branch channels are arranged in the active region of the bipolar plate and the trunk channels in the (inactive) distributor region of the bipolar plate. This may be the case additionally or alternatively to the above described arrangement of the transit region in the boundary region. The active region preferably forms a central region of the bipolar plate. The typically two distributor regions are adjacent to the active region in particular at opposite sides. As a result of this design, only a few trunk channels are required in the relatively narrow region around the reactant openings and within the distributor regions, while in the active region there is an even distribution of the reactants via a greater number of branch channels.

Especially preferably, it is provided that the overlapping region is designed to be elongated and the transit region is arranged on an end face of the overlapping region. This design also reduces the space requirement of the transit region. The coolant channel thus extends starting from the transit region over the end face of the overlapping region into the latter. The cooling channel can extend from the outer region over an end face or a lateral side of the overlapping region into the transit region.

According to a preferred embodiment of the invention, two trunk channels are connected to each other via at least two branch channels. As a result, both the supplying of reactants and the discharging of unused reactants or reaction products take place via a few trunk channels. As a result of the number of branch channels exceeding the number of trunk channels, a better distribution of the reactants in the active region of the fuel cell is achieved.

The intermediate regions are regions between the branch channels, which regions are typically delimited for the most part (or even completely) by the associated branch channels. If the intermediate regions are projected at a right angle onto the center plane of the bipolar plate, the intermediate regions partially overlap, so that an overlapping region is formed.

Where one of the intermediate regions extends past a border of the overlapping region, a region is formed that has only one of the two intermediate regions. The coolant channel extends through such a region (transit region) on the path from the outer region, which is located outside the first and second intermediate region, into the overlapping region.

Preferably, a coolant flow field has a plurality of coolant channels, while the reactant flow fields each have a plurality of channel structures. As a result, the operating media are especially homogeneously distributed. Each trunk channel can branch into at least two branch channels, in particular three, preferably four branch channels in the branching region.

Preferably, the branch channels coming from the respective branching region extend in the same direction, in particular in the direction of the same narrow side of the bipolar plate. Thus, a co-current or counter-current flow to supply the fuel cells with reactants can be accomplished particularly easily.

Preferably, it is provided that the branching region of the second channel structure is arranged at an offset with respect to the branching region of the first channel structure along a direction running in parallel to the center plane (in particular along one of the branch channels of the first channel structure). The advantageous offset therefore occurs along an extension of the second flat side of the bipolar plate. As a result, transit regions arranged in an especially space-saving manner are formed.

Preferably, it is provided that the coolant channel crosses a part of the first channel structure, which separates the outer region from the transit region, on a side facing the second flat side, in particular in a half (half plate) of the bipolar plate facing the second flat side. The part of the first channel structure arranged between the outer region and the transit region separates the outer region from the transit region. It must therefore be traversed by the coolant channel so that the coolant channel can penetrate into the transit region from the outer region. This is accomplished via the side of the first channel structure facing the second flat side, which is on the side facing away from an open side of the channel structure. This design ensures a sufficient thickness of the coolant channel in the transition into the transit region.

Preferably, it is provided that the coolant channel crosses a part of the second channel structure, which separates the transit region from the overlapping region, on a side facing the first flat side, in particular in a half of the bipolar plate facing the first flat side. The part of the second channel structure arranged between the transit region and the overlapping region separates the transit region from the overlapping region. It must therefore be traversed by the coolant channel so that the coolant channel can penetrate into the overlapping region from the transit region. This is accomplished via the side of the second channel structure facing the first flat side, which is on the side facing away from an open side of the second channel structure. This design ensures a sufficient thickness of the coolant channel in the transition into the overlapping region.

Preferably, it is provided that the coolant channel extends inside both half plates of the bipolar plate in the transit region. In the transit region, the coolant channel therefore has a thickness such that it takes up space both inside the first half plate and inside the second half plate. As a result, a pressure loss of the coolant is reduced on the path through the transit region. To this end, the second half plate can be shaped in such a way that the coolant channel and a channel (a gas channel) of the second reactant flow field share a space that is present in the thickness direction. The channel of the reactant flow field is therefore flatter (that is, locally slightly restricted) where it crosses the coolant channel.

According to a preferred embodiment of the invention, it is provided that the coolant channel fans out (or branches out), whereby an improved cooling effect is achieved. An individual coolant channel thus fans out into at least two coolant channels. Preferably, the coolant channel fans out as it leaves the outer region (that is, before entering the transit region). As a result, a fanning out of the coolant channel first takes place in a space-saving manner where an additional channel is needed. The fanning out is preferably carried out in the direction of the second flat side, whereby a further space savings is brought about. In particular, the part of the coolant channel that connects the fan-out with the coolant opening extends in the half (half plate) of the bipolar plate facing the first flat side, as a result of which there is space for the second channel structure in the half (half plate) of the bipolar plate facing the second flat side.

Additionally or alternatively, it is provided in particular that the coolant channel fans out in the transit region (that is, before entering the overlapping region). This is especially advantageous if a trunk channel branches into more than two branch channels and each intermediate space between the branch channels is to be cooled with coolant. To this end, it is preferably provided that the coolant channel in the transit region fans out (again) into the overlapping region directly upon exiting the transit region, as a result of which a fanning out of the coolant channel first takes place in a space-saving manner only when a further channel is needed. As a result, the transit region can be dimensioned as small as possible. The fanning out is preferably done in the direction of the first flat side, whereby a further space savings is brought about.

According to a preferred embodiment of the invention, it is provided that the bipolar plate comprises two half plates, between which the coolant flow field is arranged. The half plates are in particular stamped metal plates. The center plane is arranged in this case between the two half plates. Therefore, the two halves of the bipolar plate are formed by the two half plates.

Preferably, it is provided that the overlapping region is delimited by the branch channels of the first channel structure and the branch channels of the second channel structure. Thus, the overlapping region is delimited on both sides by a branch channel of the first channel structure as well as by a branch channel of the second channel structure.

Preferably, it is provided that the coolant channel in the overlapping region is delimited by the branch channels of the first channel structure and the branch channels of the second channel structure. Thus, a space made available by the overlapping region is optimally used by the cooling channel. The coolant channel is advantageously dimensioned in such a way that it extends between the branch channels inside a half of the bipolar plate facing the first flat side as well as inside a half of the bipolar plate facing the second flat side of the bipolar plate. In this case, the coolant channel is separated from the branch channels by a material of the bipolar plate.

According to a preferred embodiment of the invention, it is provided that the branch channels of the first flat side and/or the branch channels of the second flat side extend in parallel to each other. Because the branch channels of the respective flat side extend in parallel to each other, a distance between the branch channels of the respective flat side remains constant. Therefore, the coolant channel between the branch channels can also be dimensioned in such a way that it has a constant width.

Preferably, it is provided that the first reactant flow field is an anode gas flow field and the second reactant flow field is a cathode gas flow field. The first flat side is therefore an anode flat side, and the second flat side is a cathode flat side. Furthermore, the first channel structure can thus be called an anode channel structure and the second channel structure can be called a cathode channel structure. The first intermediate region can furthermore be called an anode intermediate region, while the second intermediate region can be called a cathode intermediate region. Furthermore, the first reactant openings are thus anode gas openings and the second reactant openings are cathode gas openings. In standard arrangements of operating media passages, a relatively easy conduction of the coolant flow field is thus achieved.

Furthermore, a fuel cell comprising a bipolar plate according to the invention is provided. Preferably, it is provided that the bipolar plate is arranged between two membrane electrode assemblies of the fuel cell. The fuel cell according to the invention is distinguished by an increased volumetric power density.

Furthermore, one aspect of the invention relates to a motor vehicle comprising such a fuel cell, in particular as a power supply source for the electromotive drive.

All embodiments of the invention are advantageously combinable with each other unless this is expressly excluded.

Figure 2:
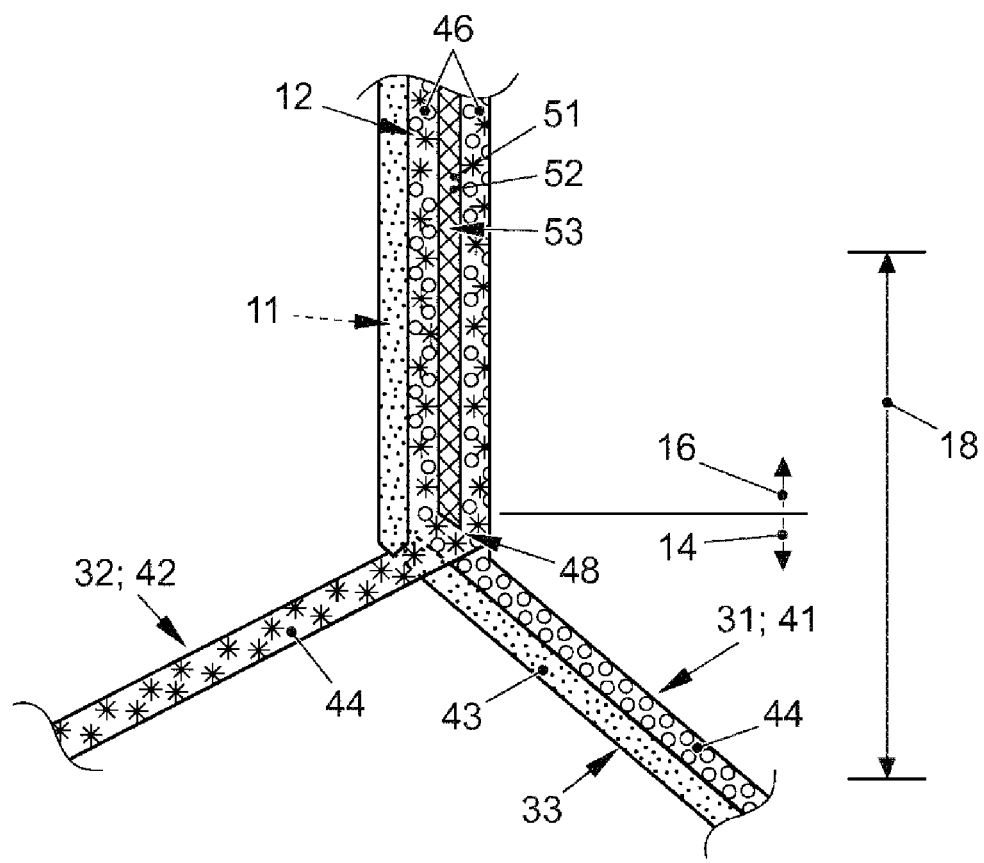
Figure 3:
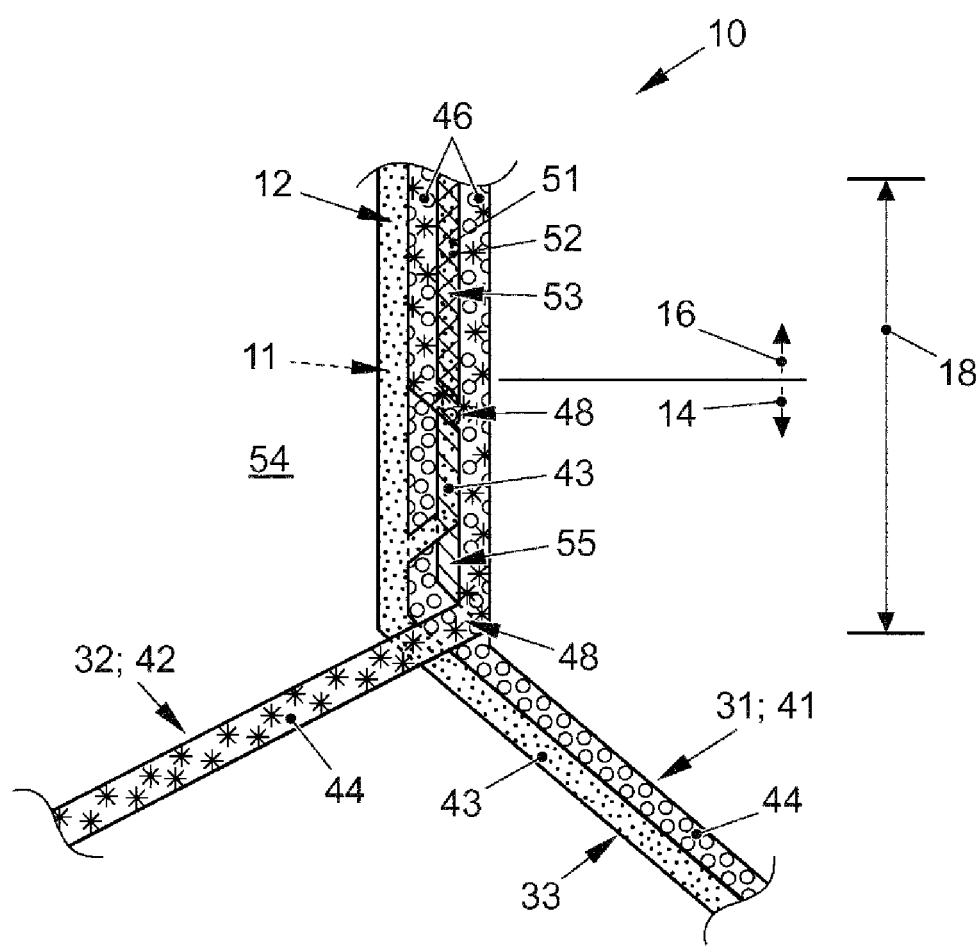
Figure 4:
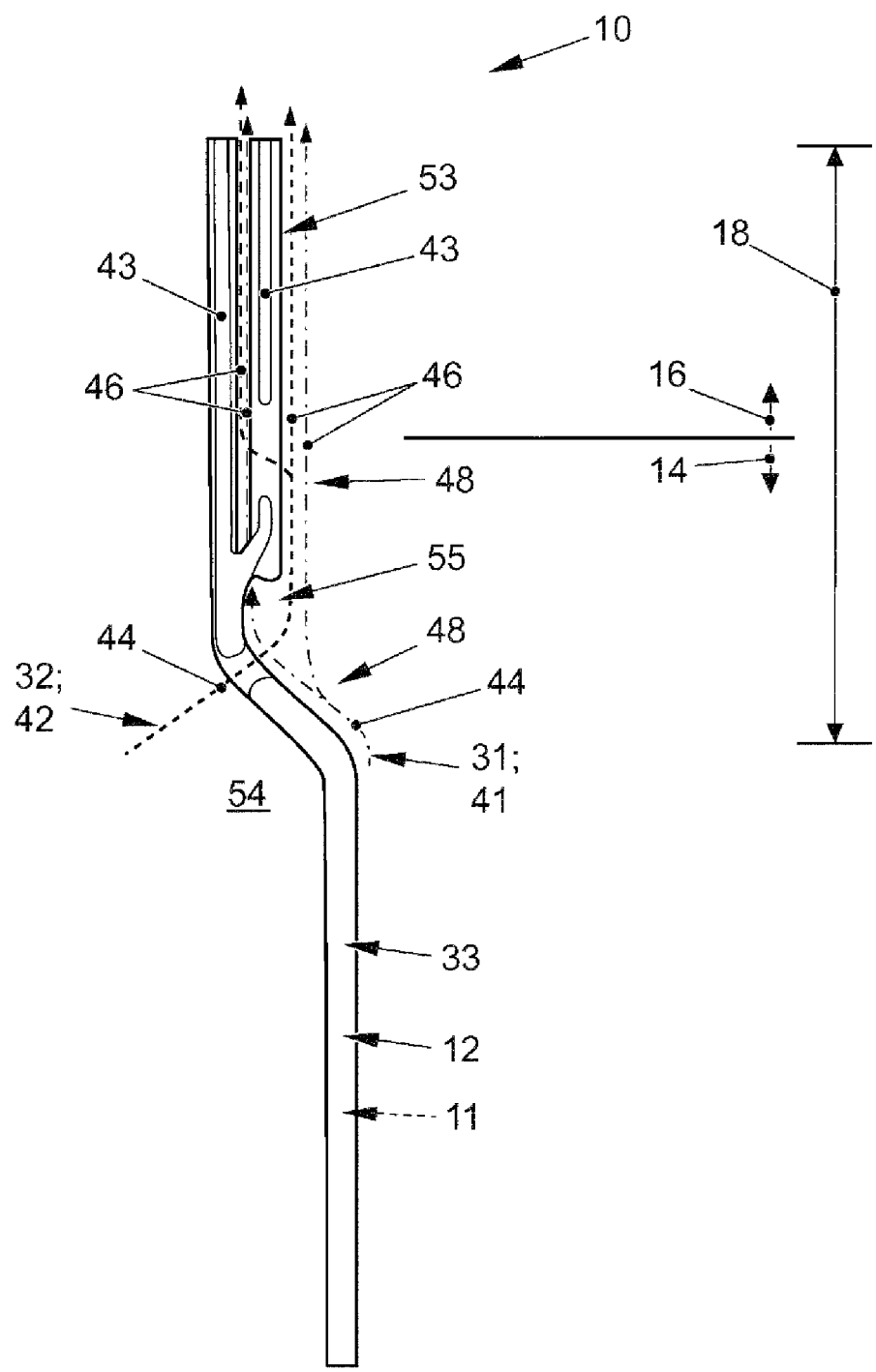
Figure 5:
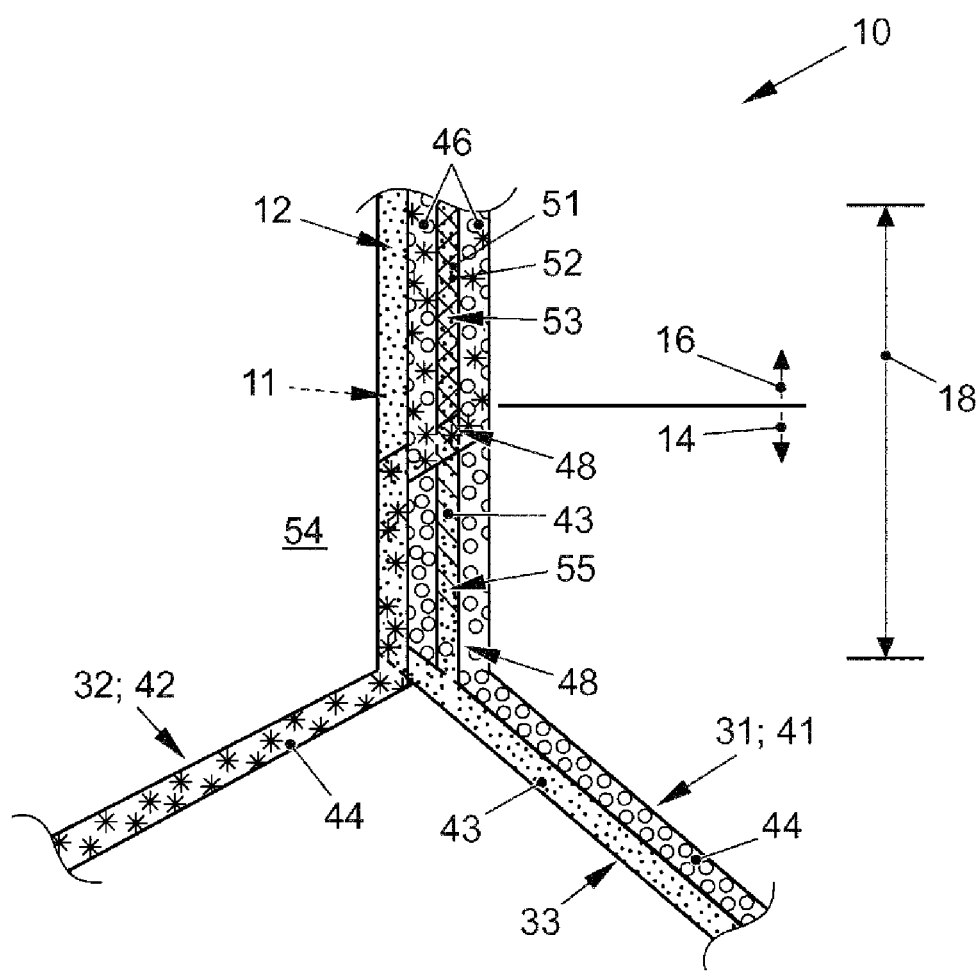
Figure 6:
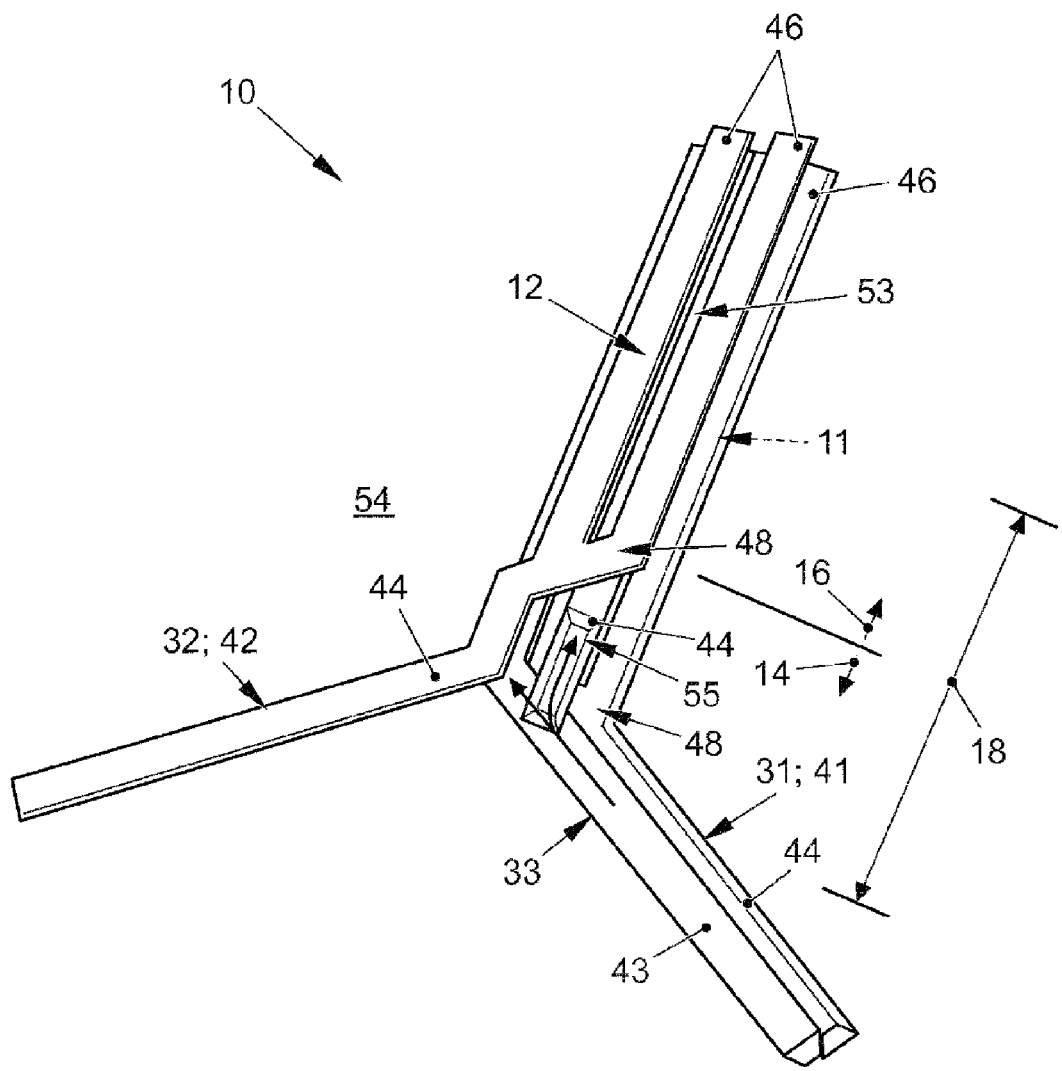

The invention is explained in more detail below in exemplary embodiments in reference to the associated drawings. The following is shown:

FIG. 1 a schematic top view of the bipolar plate according to the prior art;

FIG. 2 a top view of channel structures to illustrate the problem;

FIG. 3 a view of a subregion of the bipolar plate according to a first preferred embodiment of the invention;

FIG. 4 a top view of a coolant channel according to the first embodiment of the invention;

FIG. 5 a view of a subregion of the bipolar plate according to a second preferred embodiment of the invention; and FIG. 6 a three-dimensional illustration according to the second embodiment of the invention.

FIG. 1 shows a schematic top view of a generic bipolar plate 10. Bipolar plate 10 is provided for use in a fuel cell 100 and has a first flat side 11 and a second flat side 12, wherein the view in FIG. 1 is directed toward the second flat side 12. The flat sides 11 and 12 are arranged on opposite sides of the bipolar plate 10. In order to indicate that the first flat side 11 is arranged on a side of the figures that faces away from the view, a reference arrow of the flat side 11 is illustrated by dashed lines. The bipolar plate 10 has operating media passages that are designed as first reactant openings 21, second reactant openings 22 or coolant openings 23 and run through the bipolar plate 10 in the shown viewing direction.

The respective operating media passages 21, 22, 23 are fluidically connected to each other by associated flow fields. The flow fields include a first reactant flow field 31, which fluidically connects the first reactant openings 21 to each other, and a second reactant flow field 32, which fluidically connects the second reactant openings 22 to each other. The first and second reactant flow fields 31, 32 form open channels toward the respective flat side 11, 12. A coolant flow field 33 arranged in the interior of the bipolar plate 10, that is, an internal one, which fluidically connects the coolant openings 23 to each other, is formed by a plurality of coolant channels 43.

The bipolar plate 10 can be divided into a (chemically) active region 16 and two distributor regions 14. For example, in boundary regions 18 of the active region 16 comprising the distributor regions 14, the channels of the reactant flow fields 31, 32 can have branchings. Individual trunk channels 44 of the reactant flow fields 31, 32 are divided into a plurality of (at least two) branch channels 46 by the branchings. The division of the trunk channel 44 into the at least two branch channels 46 takes place in branching regions 48.

In detail D, which depicts a three-dimensional sectional view of bipolar plate 10 shown in FIG. 1, such a branching is shown at the transition from one of the distributor regions 14 into the active region 16. The transition from the active region 16 into the other distributor region 14 can be designed analogously.

The bipolar plates 10 can have two half plates 19, each of which forms a half of the bipolar plate 10 and together form the bipolar plate 10 or a base body of the bipolar plate 10. To this end, the half plates 19 are stacked with their flat sides on top of each other and sealed against each other, for example welded, whereby the coolant flow field 33 is sealed off from the environment. Located on the outer sides of the half plates 19 joined to a bipolar plate 10 are reactant flow fields 31, 32, while the coolant flow field 33 is formed between the half plates 19. The half plates 19 can be stamped, for example, from a metal sheet.

The trunk channels 44 extend as a plurality of elongated channels so that elongated ridges 50, which are arranged between trunk channels 44 and spatially separate the trunk channels 44 from each other, can be used as space for the cooling channels 43. These cooling channels 43 can also be continued as cooling channels 43 in the active region 16 and then extend in parallel to the branch channels 46—see detail D. In detail D, it is also evident that a ridge 50, which separates the two branch channels 46 of a channel structure 41, 42 from each other, has its start in the branching region 48.

The bipolar plates 10 are optimized to the effect that they have as minimal an extension as possible in their thickness direction 60 (thus, at a right angle to the extension of their flat sides 11, 12), that is, overall as minimal a (plate) thickness as possible. As a result, a cell spacing between individual cells (not depicted) of the fuel cell 100 is reduced, which makes it possible to accommodate more individual cells while the thickness of the fuel cell 100 remains the same. Without going below a minimum maintained wall thickness of a material of the half plates 19 and a minimum required channel height, the channels of the two reactant flow fields 31, 32 and of the coolant flow field 33 cannot be stacked on top of each other in the thickness direction 60. Thus, it has not been possible so far to provide coolant channels 43 in the ridges 50 between the branch channels 46, which is way a region between associated branch channels 46 has not been cooled so far.

In FIG. 2, parts of the reactant flow fields 31, 32 and of the coolant flow field 33 are depicted transparently one on top of the other, with the viewing direction corresponding to the top view in FIG. 1, in order to illustrate the problem. Of the flow fields 31, 32, 33, regions close to one of the branching regions 48 are depicted.

The boundary lines of the flow fields 31, 32, 33 are shown in accordance with their visibility. Symbols that illustrate the course of the flow fields 31 (points for the coolant flow field, circles for the first flow field and stars for the second flow field) are depicted showing through the flow fields located above them in order to be able to also understand the course of the flow fields located underneath. In this way, the branch channels 46 that have a partially coincident course on the first flat side 11 and the second flat side 12 can be depicted.

By virtue of the relatively minimal thickness of the bipolar plate 10, it has so far not been possible according to the prior art to connect an open space 49 inside the ridge 50 between the two branch channels 46 of channel structures 31, 32 to the coolant flow field 33. The open space 49 could thus not be supplied with coolant during the operation of the fuel cell 100.

Therefore, the problem results primarily if the number of channels in the active region 16 advantageously exceeds the number of channels in the adjacent distributor region 14. The branching (division) required for this, which occurs at the border between the active region 16 and distributor regions 14, makes a division of a coolant channel 43 more difficult, as is evident in FIG. 2.

In the case of thicker bipolar plates 10, a penetration of the coolant channel 43 between the two branch channels 46 would theoretically be possible because the bipolar plate 10 could be dimensioned in the thickness direction 60 to be sufficiently thick in order to ensure a division of all three operating media (fluids) at the same location. This is not possible or is at least not worth the effort because of the reduced thickness in current bipolar plates.

FIG. 3 shows a view of a subregion of the bipolar plate 10 according to a first preferred embodiment of the invention. The discussion below mainly concerns the distinguishing features of the bipolar plate 10 according to the invention in comparison to the bipolar plate 10 shown in FIGS. 1 and 2.

The bipolar plate 10 according to the first preferred embodiment of the invention differs from the bipolar plate 10 shown in FIGS. 1 and 2 in that coolant channels 43 are also provided between the branch channels 46 of the respective channel structure 31, 32.

As is also evident in FIGS. 1 and 2, a first intermediate region 51 is formed between the branch channels 46 of the first channel structure 31 and a second intermediate region 52 is formed between the branch channels 46 of the second channel structure 32. In FIGS. 1, 2, 3 and 5, the intermediate regions 51 and 52 are represented by differently oriented hatchings. However, the hatchings evident in detail D of FIG. 1 serve merely to illustrate the sectional area.

The normal projections of the first and second intermediate region 51, 52 onto a center plane 56 arranged between the two flat sides 11, 12 of the bipolar plate 10 partially overlap so that an overlapping region 53 is formed. The intermediate regions 51, 52 depicted in FIGS. 1, 2, 3 and 5 are shown as such normal projections. All of the intermediate regions 51 and 52 inside the overlapping region 53 are depicted in FIGS. 1 and 2. The center plane 56 extends between the two flat sides 11 and 12 of the bipolar plate 10, that is, in parallel to their surface. In a design of the bipolar plate 10 as shown in detail D of FIG. 1, the center plane 56 extends between the two half plates 19.

According to the invention, it is now provided however that a subregion of the first intermediate region 51 projects from the overlapping region 53. The partial region of first intermediate region 51 is referred to below as transit region 55. A coolant channel 43 extends from an outer region 54, which is located outside the first and second intermediate region 51, 52, into the overlapping region 53, crossing the transit region 55 in the process.

As a result, the coolant channel 43 does not have to pass between the first and second channel structures 41, 42 simultaneously, as would be necessary according to the prior art as shown in FIGS. 1 and 2.

Rather, the coolant channel 43 crosses over a portion of the first channel structure 41, which separates the outer region 54 from the transit region 55 on a side facing toward the second flat side 12. In the example according to FIGS. 3 and 4, the coolant channel 43 traverses, or crosses, one of the branch channels 46 of the first channel structure 41. This takes place in a half of the bipolar plate 10 that faces the second flat side 12, that is, in the half plate 19 of the bipolar plate 10 that faces the second flat side 12. This is especially evident in FIG. 4, which depicts a top view of a coolant channel 43 according to the first embodiment of the invention. Of the coolant channel 43, an open volume of the coolant channel 43 (that is, a "channel content") is shown in this case.

The portion of the second channel structure 42 that separates the transit region 55 from the overlapping region 53 traverses the coolant channel 43 on a side of the channel structure 42 that faces toward the first flat side 11. This takes place in a half of the bipolar plate 10 that faces the first flat side 11, that is, in the half plate 19 of the bipolar plate 10 that faces the first flat side 11—see once again FIG. 4. As is evident in FIG. 4, the trunk channel 44 of the second channel structure 42 also crosses the coolant channel 43 in the half of the bipolar plate 10 that faces the second flat side 12. Otherwise, the coolant channel 43 may extend on both halves of the bipolar plate 10 so that it extends both between the branch channels 46 of the first channel structure 41 and between the branch channels 46 of the second channel structure 42.

In order to enable as compact as possible an arrangement of a plurality of channel structures 41 or 42 adjacent to each other to a reactant flow field 31 or 32, the branching regions 48 are arranged at an offset along a direction extending in parallel to the center plane 56. In particular, the branching region 48 of the second channel structure 42 is arranged at an offset along the branching channels 46 of the first channel structure 41. The branching channels 46 of the first and second channel structure 41, 42 have an essentially mirror-symmetric course with respect to the center plane 56. The offset, which is evident in FIG. 4, of the branch channels 46 of the first channel structure 41 with respect to the branch channels 46 of the second channel structure 42 is not shown for the sake of visibility.

The overlapping region 53 is designed to be elongated and the transit region 55 is arranged on an end face (that is, on a narrow side) of the overlapping region 53 in the boundary region 18 of the active region 16 and of the distributor region 14. Thus, the coolant channel 43 penetrates into the overlapping region 53 via an end face of the latter. It is evident from FIG. 3 and also FIG. 5 that the reactant flow fields 31 and 32 can be formed by the shown partial regions being arranged at a lateral offset in a row. The trunk channels 44 are again arranged in the distributor region 14 of the bipolar plate 10, while the branch channels 46 are arranged in the active region 16 of the bipolar plate 10.

The coolant channel 43 fans out upon exiting the outer region 54 on the path into the transit region 55, thereby providing a space-saving fan-out of the coolant channel 43. Two coolant channels 43 thus extend in parallel to each two branch channels 46 of the first and second channel structure 41, 42. This results in one coolant channel 43 extending between the total of four branch channels 46 of the first and second channel structure 41, 42 as well as one coolant channel 43 extending between two adjacent first channel structures 41 and two adjacent second channel structures 42.

As is evident, the coolant channel 43 in the overlapping region 53 is delimited by the branch channels 46 of the first channel structure 41 and the branch channels 46 of the second channel structure 42. The branch channels 46 and the coolant channel 43 are thus only separated from each other by a shared wall.

The first reactant flow field 31 can be used inside the fuel cell 100 as an anode gas flow field 31, and the second reactant flow field 32 can be used as a cathode gas flow field 32. The first flat side 11 can thus be called an anode flat side 11 and the second flat side can be called a cathode flat side 12. Furthermore, the first channel structure 41 can be called an anode channel structure 41 and the second channel structure 42 can be called a cathode channel structure 42. The first intermediate region 51 can furthermore be called an anode intermediate region 51, while the second intermediate region 52 can be called a cathode intermediate region 52. Thus, in standard arrangements of operating media passages—that is, coolant openings 23, first reactant openings 21, which can be called anode gas openings 21, and second reactant openings 22, which can be called cathode gas openings 22—a relatively easy conduction of the coolant flow field 33 is achieved.

As a whole, the operating media passages 21, 22, 23 can be arranged on opposite sides of the bipolar plate 10, as is evident in FIG. 1. As a result, the active region 16 is arranged between the operating media openings 21, 22, 23.

FIG. 5 shows a view of a subregion of the bipolar plate 10 according to a second preferred embodiment of the invention. In contrast to the aforementioned first preferred embodiment of the invention, the coolant channel 43 crosses the first channel structure 41 at the branching region 48 of the first channel structure 41, that is, at an end face of the elongated overlapping region 53.

The trunk channel 44 of the second channel structure 42 extends in sections on a side of the coolant channel 43 facing the second flat side 12 until it transitions into the branching region 48. An offset of the two branching regions 48 in a longitudinal direction of the branch channels 46 thereby also results.

FIG. 6 shows a three-dimensional illustration of a segment of the flow fields 31, 32, 33 according to the second embodiment of the invention, which is evident in FIG. 5. Of the flow fields 31, 32, 33, open volumes of the flow fields 31, 32, 33 (that is, "channel contents") are shown in this case. The half plates 19 provide trapezoidal cross-sections for the channels 43, 44, 46. The trapezoidal cross-sections facilitate on the one hand the manufacture of the half plates 19 and simultaneously enlarge a discharge surface of reactants from the channel structures 41, 42.

In the two preferred embodiments, only branchings of a trunk channel 44 into two branch channels 46 each are shown for the sake of simplicity. However, it is also possible—for example on the cathode side 12 or on both sides 11, 12—to respectively divide trunk channels 44 into three, four or more branch channels 46.

During the operation of the fuel cell 100, an anode gas, for example hydrogen, enters through one of the first reactant openings into the first reactant flow field 31 and is conducted in the distributor region 14 by the trunk channels 44 of the first reactant flow field 31 to the branching region 48. In the branching region 48, the anode gas is divided into the branch channels 46 of first reactant flow field 31—see arrow directions in FIG. 4.

Analogously to this, during the operation of the fuel cell 100, a cathode gas, for example air, enters through one of the second reactant openings 22 into the second reactant flow field 32 and is conducted in the distributor region 14 by the trunk channels 44 of the second reactant flow field 32 to the branching region 48 of the second reactant flow field 32. In the branching region 48, the cathode gas is divided into the branch channels 46 of the second reactant flow field 32—see also arrow directions in FIG. 4. In this case, the two reactants do not have to flow in the same direction; they can also flow, for example, counter-current.

A coolant, for example a water/antifreeze mixture, is introduced through one of the coolant openings 23 into the coolant flow field 33 and is divided shortly before entry into the transit region 55. The flow direction of the coolant can be directed inside distributor region 14 both in the flow direction shown in FIG. 6 and in the opposite flow direction.

In the active region 16, the anode and cathode gas exit the bipolar plate 10 and are typically conducted through a gas diffusion layer (not depicted) to a membrane electrode assembly, where the fuel cell process takes place. In the fuel cell process, (waste) heat is produced, which is absorbed by the coolant. As a result of coolant channels 43 also being provided now in the overlapping regions 53, a temperature is homogenized in the fuel cell 100; therefore, fewer local temperature fluctuations occur.

In the transition from the active region 16 into the second distributor region 14, the branch channels 46 of the flow fields 31, 32 merge back in the branching regions 48 into the trunk channels 44, which lead to the reactant openings 21, 22. The fanned-out coolant channels 43 are also in part brought back together and lead to the coolant opening 23. This can occur in the reverse manner as in the transition from the distributor region 14 into the active region 16. In this case, the arrow directions shown in FIGS. 4 and 6 are reversed.

In summary, it can be noted that a coolant channel 43 can be arranged between the branch channels 46 of the channel structures 41, 42 as a result of the invention described above, even in the case of flat bipolar plates 10. This is accomplished by the coolant channel 53 extending on both sides 11, 12 of the bipolar plate 10. For this purpose, the coolant channel 53 takes on a negative form of a geometry of the anode channel structure 41 or the cathode channel structure 42. The coolant channel 43 thus weaves through between the channel structures 41 and 42 in order to arrive in the overlapping region 53.

In order to be able to divide the three operating media (both reactants and the coolant) within a relatively small region, a new geometry was created. The geometry makes it possible for the coolant, which normally flows within a half or half plate 19 (in the anode gas half, that is, the fuel half) of the bipolar plate 10 that faces the first flat side 11, to "jump" to a half or half plate 19 of the bipolar plate 10 that faces the second flat side 12. This occurs in a region that has no second channel structures 42. As a result, the coolant can flow past a channel bottom of the first channel structure 41. Next, the coolant can flow past a channel bottom of the second channel structure 42. To this end, the anode gas and cathode gas flows are phase-shifted, that is, they are divided at different locations.

Thinner bipolar plates are realized as a result of the invention. Furthermore, with an equally distributed coolant flow distribution, fewer channels are provided in the distributor region 14 than in the active region 16.

LIST OF REFERENCE SYMBOLS

10 Bipolar plate
11 First flat side/anode flat side
12 Second flat side/cathode flat side
14 Distributor region
16 Active region
18 Boundary region
19 Half plates
21 First reactant opening/anode gas opening
22 Second reactant opening/cathode gas opening
23 Coolant opening 31 First reactant flow field/anode gas flow field
32 Second reactant flow field/cathode gas flow field
33 Coolant flow field
41 First channel structure/anode channel structure
42 Second channel structure/cathode channel structure
43 Coolant channel
44 Trunk channel
46 Branch channel
48 Branching region
49 Open space
50 Ridge
51 First intermediate region
52 Second intermediate region
53 Overlapping region
54 Outer region
55 Transit region
56 Center plane
100 Fuel cell

The invention claimed is:

1. A bipolar plate for a fuel cell, comprising:
an internal coolant flow field, which includes a coolant channel;
a first flat side with a first reactant flow field, which has at least one first channel structures;
a second flat side with a second reactant flow field, which has at least one second channel structure;
wherein
the first flat side and the second flat side are arranged on opposite sides of the bipolar plate; and
the first and second channel structure each form a trunk channel and branch channels;
wherein
the respective branch channels branch off in a branching region of the respective trunk channel, and a first intermediate region is formed between the branch channels of the first channel structure, and a second intermediate region is formed between the branch channels of the second channel structure, wherein normal projections of the first and second intermediate region onto a center plane of the bipolar plate partially overlap so that an overlapping region is formed, the center plane being arranged between the first and second flat sides of the bipolar plate;
wherein the coolant channel extends from an outer region, which is located outside the first and second intermediate regions, into the overlapping region and crosses a transit region that is a subregion of the normal projection of the first intermediate region onto the center plane, the subregion projecting from the overlapping region.

2. The bipolar plate according to claim 1, wherein the transit region is arranged in a boundary region of an active region with a distributor region.

3. The bipolar plate according to claim 2 wherein the branch channels are arranged in the active region and the trunk channels are arranged in the distributor region.

4. The bipolar plate according to claim 1 wherein the overlapping region is designed to be elongated, and the transit region is arranged on an end face of the overlapping region.

5. The bipolar plate according to claim 1 wherein the coolant channel crosses a part of the first channel structure, which separates the outer region from the transit region, on a side facing the second flat side, in particular in a half of the bipolar plate that faces the second flat side.

6. The bipolar plate according to claim 1 wherein the coolant channel crosses a part of the second channel structure, which separates the transit region from the overlapping region, on a side facing the first flat side, in particular in a half of the bipolar plate that faces the first flat side.

7. The bipolar plate according to claim 1 wherein the coolant channel fans out as it exits the outer region.

8. The bipolar plate according to claim 1 wherein the coolant channel in the overlapping region is delimited by the branch channels of the first channel structure and the branch channels of the second channel structure.

9. The bipolar plate according to claim 1 wherein the first reactant flow field is an anode gas flow field and the second reactant flow field is a cathode gas flow field.

10. A fuel cell comprising a bipolar plate including:
an internal coolant flow field, which includes a coolant channel; a first flat side with a first reactant flow field, which has at least one first channel structure;
a second flat side with a second reactant flow field, which has at least one second channel structure; wherein
the first flat side and the second flat side are arranged on opposite sides of the bipolar plate; and
the first and second channel structure each form a trunk channel and branch channels;
wherein the respective branch channels branch off in a branching region of the respective trunk channel, and a first intermediate region is formed between the branch channels of the first channel structure, and a second intermediate region is formed between the branch channels of the second channel structure, wherein normal projections of the first and second intermediate region onto a center plane of the bipolar plate partially overlap so that an overlapping region is formed, the center plane being arranged between the first and second flat sides of the bipolar plate;
wherein the coolant channel extends from an outer region, which is located outside the first and second intermediate regions, into the overlapping region and crosses a transit region that is a subregion of the normal projection of the first intermediate region onto the center plane, the subregion projecting from the overlapping region.

11. The fuel cell according to claim 10 wherein the transit region is arranged in a boundary region of an active region with a distributor region.

12. The fuel cell according to claim 11 wherein the branch channels are arranged in the active region and the trunk channels are arranged in the distributor region.

13. The fuel cell according to claim 10 wherein the overlapping region is designed to be elongated, and the transit region is arranged on an end face of the overlapping region.

14. The fuel cell according to claim 10 wherein the coolant channel crosses a part of the first channel structure, which separates the outer region from the transit region, on a side that faces the second flat side.

15. The fuel cell according to claim 10 wherein the coolant channel crosses a part of the second channel structure, which separates the transit region from the overlapping region, on a side that faces the first flat side.

16. The fuel cell according to claim 10 wherein the coolant channel fans out as it exits the outer region.

17. The fuel cell according to claim 10 wherein the coolant channel in the overlapping region is delimited by the branch channels of the first channel structure and the branch channels of the second channel structure.

18. The fuel cell according to claim 10 wherein the first reactant flow field is an anode gas flow field and the second reactant flow field is a cathode gas flow field.

* * * * *